United States Patent
Bankiti et al.

(10) Patent No.: US 11,948,381 B2
(45) Date of Patent: Apr. 2, 2024

(54) DETERMINING OBJECT MOBILITY PARAMETERS USING AN OBJECT SEQUENCE

(71) Applicant: Motional AD LLC, Boston, MA (US)

(72) Inventors: Varun Bankiti, Los Angeles, CA (US); Oscar Beijbom, Santa Monica, CA (US); Tianwei Yin, Austin, TX (US)

(73) Assignee: Motional AD LLC, Boston, MA (US)

( * ) Notice: Subject to any disclaimer, the term of this patent is extended or adjusted under 35 U.S.C. 154(b) by 403 days.

(21) Appl. No.: 17/407,992

(22) Filed: Aug. 20, 2021

(65) Prior Publication Data
US 2023/0057118 A1    Feb. 23, 2023

(51) Int. Cl.
*G06V 30/262*    (2022.01)
*B60W 60/00*    (2020.01)
(Continued)

(52) U.S. Cl.
CPC ............ *G06V 30/274* (2022.01); *G01S 17/42* (2013.01); *G01S 17/58* (2013.01); *G01S 17/89* (2013.01);
(Continued)

(58) Field of Classification Search
CPC ...... G06V 30/274; G06V 20/58; G01S 17/42; G01S 17/58; G01S 17/89; G06F 18/21; G06T 7/10; G06T 7/20; G06T 7/70; G06T 2207/20084; G06T 2207/30261; G06T 2207/10028; G06T 2207/30196;
(Continued)

(56) References Cited

U.S. PATENT DOCUMENTS 9,523,772 B2 * 12/2016 Rogan .................... G06V 40/20
10,444,759 B2 * 10/2019 Douillard .................. G06T 7/11
(Continued)

FOREIGN PATENT DOCUMENTS

CA           3157926 A1 *  9/2021  ............. G06F 16/29
WO    WO-2021030640 A1 *  2/2021  ............... G06N 3/08
(Continued)

OTHER PUBLICATIONS

Lang, A. et al., "PointPillars: Fast Encoders for Object Detection from Point Clouds", CVPR 2019, May 2019, arXiv:1812.05784v2, in 9 pages.
(Continued)

*Primary Examiner* — Mahendra R Patel
(74) *Attorney, Agent, or Firm* — Knobbe, Martens, Olson & Bear, LLP

(57) ABSTRACT

A system can use semantic images, lidar images, and/or 3D bounding boxes to determine mobility parameters for objects in the semantic image. In some cases, the system can generate virtual points for an object in a semantic image and associate the virtual points with lidar points to form denser point clouds for the object. The denser point clouds can be used to estimate the mobility parameters for the object. In certain cases, the system can use semantic images, lidar images, and/or 3D bounding boxes to determine an object sequence for an object. The object sequence can indicate a location of the particular object at different times. The system can use the object sequence to estimate the mobility parameters for the object.

20 Claims, 11 Drawing Sheets

(51) Int. Cl.

| | | |
|---|---|---|
| *G01S 17/42* | (2006.01) | |
| *G01S 17/58* | (2006.01) | |
| *G01S 17/89* | (2020.01) | |
| *G06F 18/21* | (2023.01) | |
| *G06T 7/10* | (2017.01) | |
| *G06T 7/20* | (2017.01) | |
| *G06T 7/70* | (2017.01) | |
| *G06V 20/58* | (2022.01) | |

(52) U.S. Cl.
CPC ............... *G06F 18/21* (2023.01); *G06T 7/10* (2017.01); *G06T 7/20* (2013.01); *G06T 7/70* (2017.01); *G06V 20/58* (2022.01); *B60W 60/001* (2020.02); *B60W 2420/42* (2013.01); *B60W 2420/52* (2013.01); *B60W 2554/4026* (2020.02); *B60W 2554/4029* (2020.02); *B60W 2554/404* (2020.02); *G06T 2207/20084* (2013.01); *G06T 2207/30261* (2013.01)

(58) Field of Classification Search
CPC . G06T 7/73; G06T 7/246; G06T 2207/30252; G06T 2210/12; B60W 60/001; B60W 2420/42; B60W 2420/52; B60W 2554/4026; B60W 2554/4029; B60W 2554/404
USPC .......................................................... 381/104
See application file for complete search history.

(56) References Cited

U.S. PATENT DOCUMENTS

| | | | | |
|---|---|---|---|---|
| 10,976,410 | B1 * | 4/2021 | Wang | .................... G01S 13/726 |
| 11,087,494 | B1 * | 8/2021 | Srinivasan | .............. G01S 17/89 |
| 11,285,963 | B2 * | 3/2022 | Raichelgauz | ......... B60W 50/14 |
| 11,354,913 | B1 * | 6/2022 | Houston | .................. G06F 18/24 |
| 11,521,394 | B2 * | 12/2022 | Beijbom | .............. H04N 19/597 |
| 11,657,572 | B2 * | 5/2023 | Jian | ........................ G06V 20/64 |
| | | | | 345/419 |
| 11,693,927 | B2 * | 7/2023 | Sheu | ........................ G06T 11/20 |
| | | | | 701/36 |
| 11,715,257 | B2 * | 8/2023 | Lasram | .................... G06F 30/23 |
| | | | | 345/418 |
| 2019/0258737 | A1 * | 8/2019 | Wang | ..................... G06F 16/287 |
| 2019/0311546 | A1 * | 10/2019 | Tay | ........................ G05D 1/0088 |
| 2020/0218979 | A1 * | 7/2020 | Kwon | .................... G06F 18/2155 |
| 2020/0225669 | A1 * | 7/2020 | Silva | .................... B60W 60/0011 |
| 2020/0284913 | A1 * | 9/2020 | Amelot | .................. G01S 7/4808 |
| 2020/0309957 | A1 * | 10/2020 | Bhaskaran | .............. G01S 17/86 |
| 2020/0398833 | A1 * | 12/2020 | Hudecek | .............. G05D 1/0088 |
| 2021/0063578 | A1 * | 3/2021 | Wekel | ...................... G01S 7/481 |
| 2021/0146952 | A1 * | 5/2021 | Vora | ......................... G06N 3/08 |
| 2021/0150230 | A1 * | 5/2021 | Smolyanskiy | ......... G06V 20/56 |
| 2021/0192748 | A1 * | 6/2021 | Morales Morales | .. G06V 10/82 |
| 2021/0192757 | A1 * | 6/2021 | Yu | ............................ G06T 7/248 |
| 2022/0026917 | A1 * | 1/2022 | Beijbom | .................. G06V 20/588 |
| 2022/0111868 | A1 * | 4/2022 | Costea | ..................... G06T 17/10 |
| 2022/0185331 | A1 * | 6/2022 | Kaiser | ................. B60W 50/045 |
| 2022/0317300 | A1 * | 10/2022 | Stenson | .................. G01S 17/58 |

FOREIGN PATENT DOCUMENTS

| | | | | |
|---|---|---|---|---|
| WO | WO-2021050600 A2 * | 3/2021 | ............. | G06N 3/006 |
| WO | WO-2021050745 A1 * | 3/2021 | ........ | B60W 30/0953 |
| WO | WO-2021086796 A1 * | 5/2021 | ........... | G05D 1/0088 |
| WO | WO-2021138616 A1 * | 7/2021 | ............ | B60W 10/04 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Vora, S. et al., "PointPainting: Sequential Fusion for 3D Object Detection", CVPR 2020, May 2020, arXiv:1911.10150v2, in 11 pages.

Great Britain Office Action issued for Application No. GB 2114124. 7, dated Jun. 7, 2022.

* cited by examiner

DETERMINING OBJECT MOBILITY PARAMETERS USING AN OBJECT SEQUENCE

BACKGROUND

Determining mobility parameters of an object can be difficult and the results may be inaccurate.

DETAILED DESCRIPTION

Figure 1:
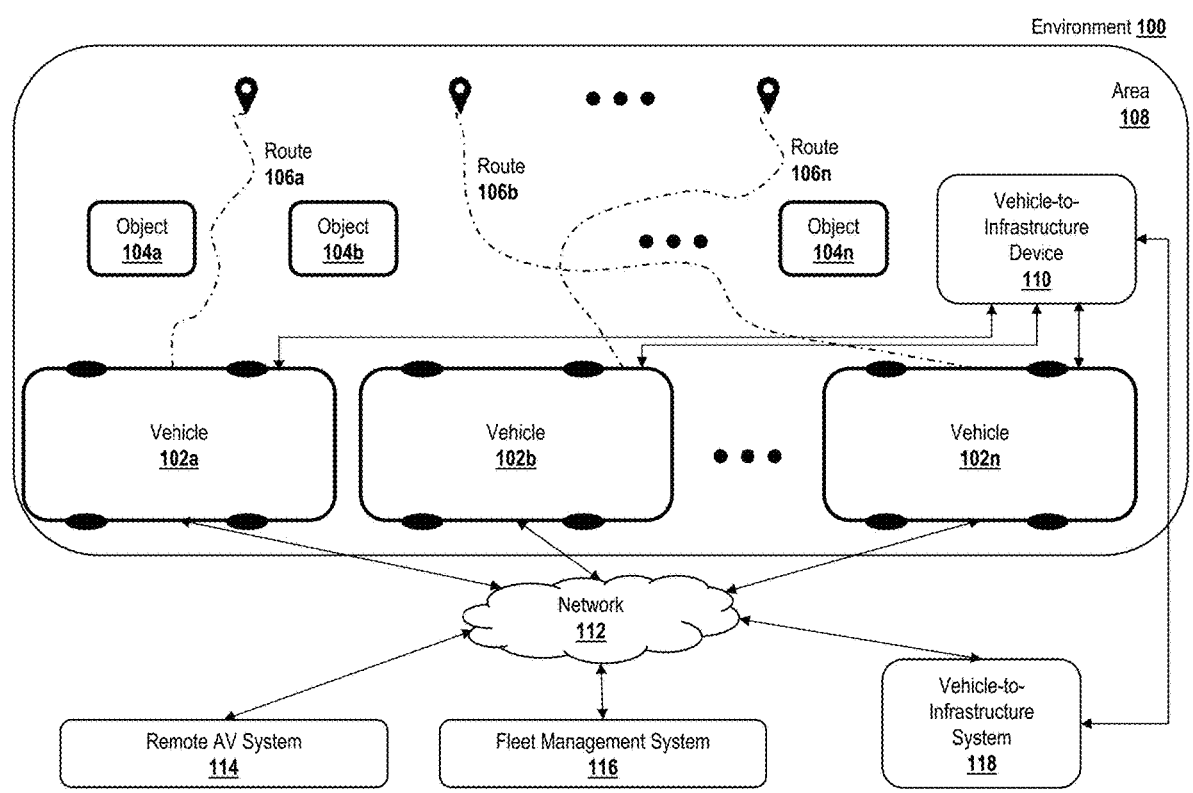
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

Lidar systems may provide sparse point cloud measurements, which can make it difficult to determine or estimate mobility parameters of an object in a semantic image, such as, the orientation or velocity of a pedestrian or a bicycle. Inaccurate estimations can lead to suboptimal tracking performance. In some aspects and/or embodiments, systems, methods, and computer program products described herein include and/or implement a multi-modal fusion pipeline system that uses virtual points and/or multiple semantic images from different times to determine more accurate determine mobility parameters for an object. For example, the system can generate virtual points for an object in a semantic image and associate the virtual points with lidar points that fall on the object in the semantic image. The addition of the virtual points with the lidar points can create a denser point cloud for the object and enable the system to more accurate determine mobility parameters for the object. Furthermore, the system can identify the location of an object in a semantic image at time t(0), and use an estimated velocity of the object to predict the object's position at previous points in time (e.g., at time t(−1), t(−2), etc.). The system can use the predicted location of the object at the previous times to identify a corresponding object in earlier semantic images. The system can use the identified object in the earlier semantic images to generate an object sequence for the object and use the object sequence to determine more accurate mobility parameters for the object.

By virtue of the implementation of systems, methods, and computer program products described herein, an object detection and tracking system, such as an object detection and tracking system in an autonomous vehicle, can more accurately identify objects within an image, more accurately identify the location of identified objects within the image, and more accurately determine mobility parameters for an object, such as the object's orientation and velocity.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
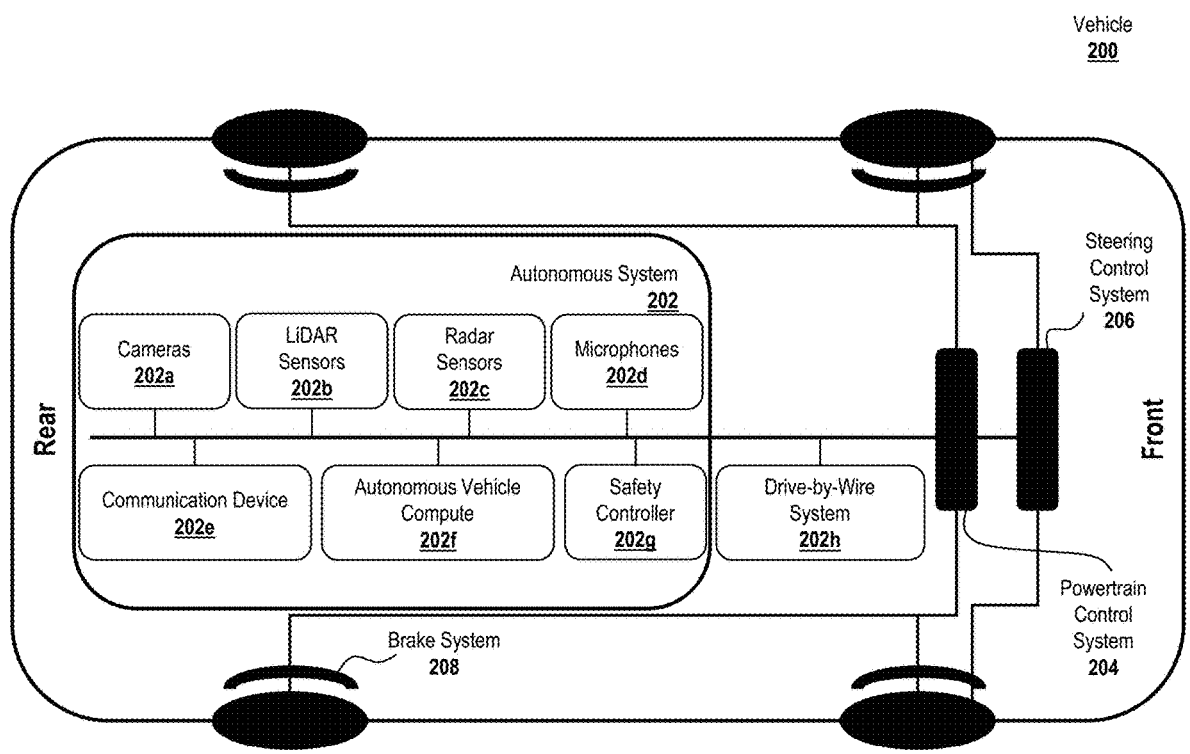
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
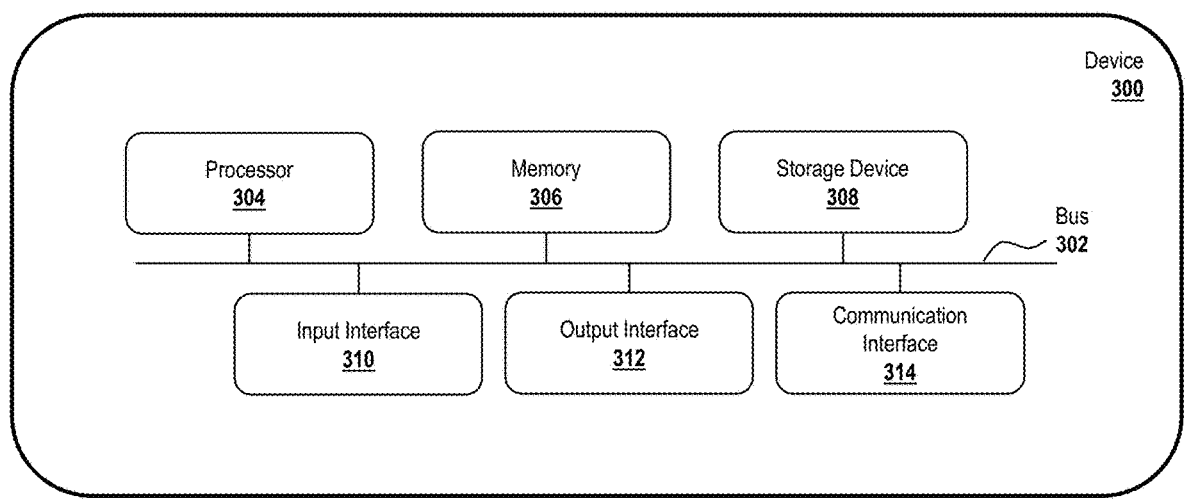
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
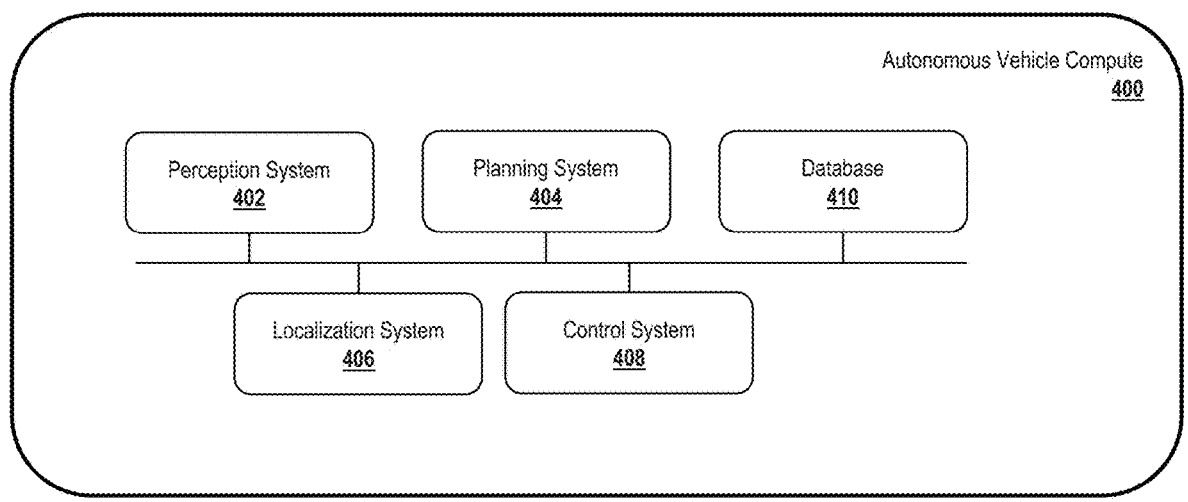
FIG. 4A is a diagram of certain components of an autonomous system.
Figure 4B:
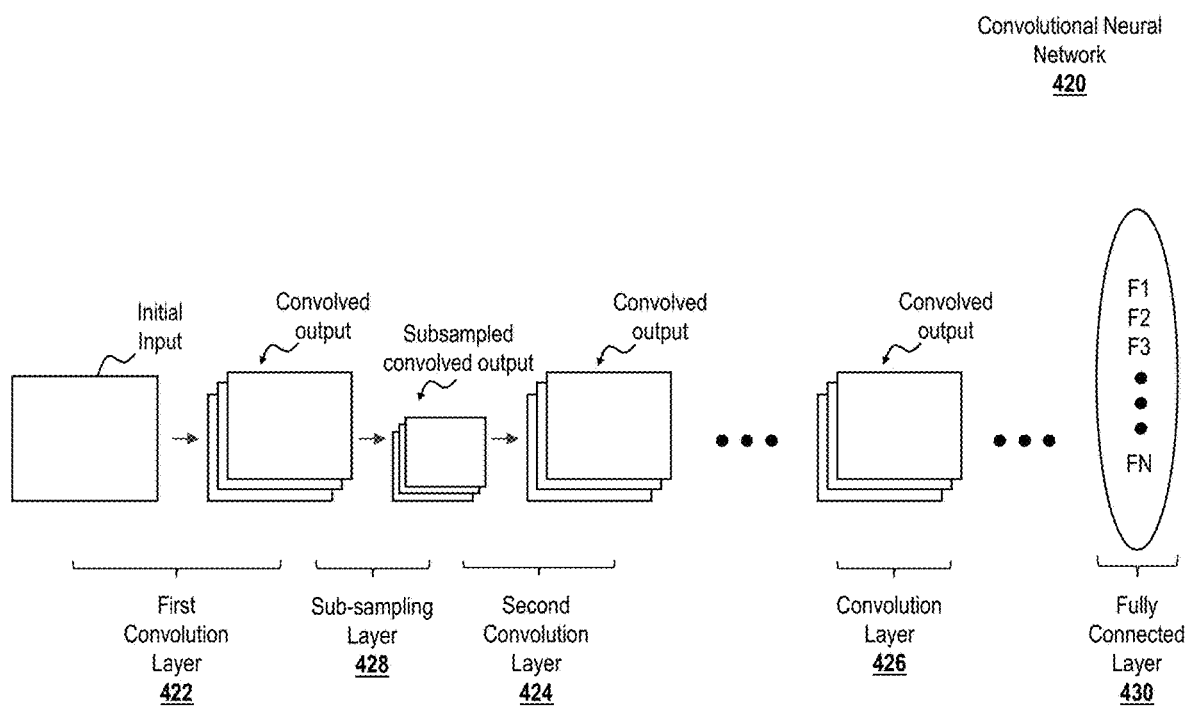
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
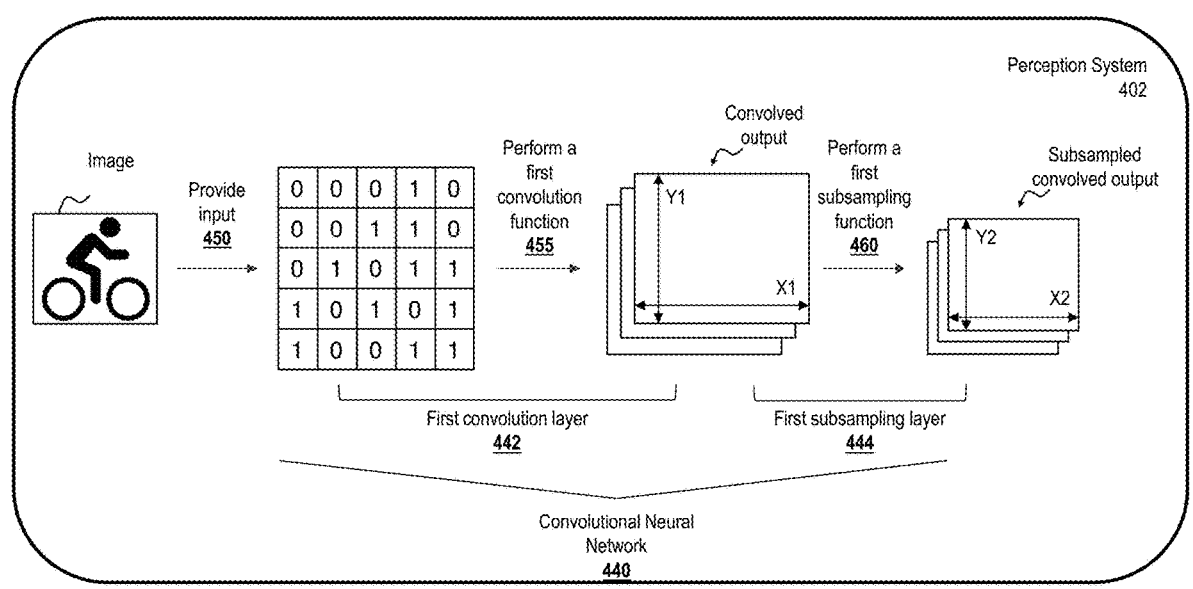
FIGS. 4C and 4D are a diagram illustrating example operation of a CNN.
Figure 4D:
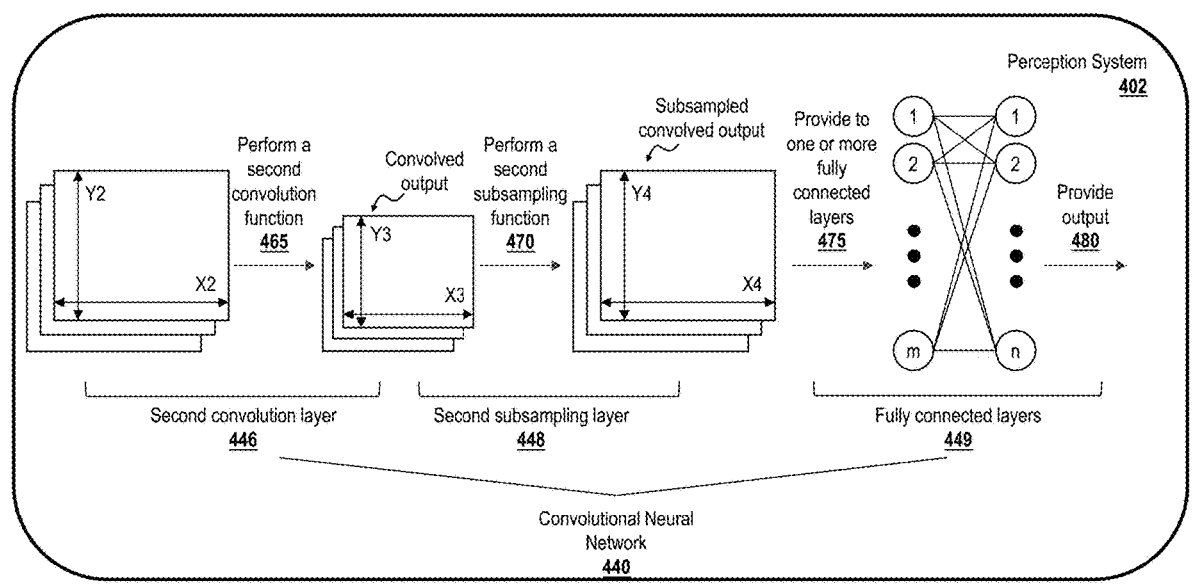

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output 480 of each neuron of second subsampling layer 448 to fully connected layers 449. For example, CNN 440 provides the output 480 of each neuron of second subsampling layer 448 to fully connected layers 449 to cause fully connected layers 449 to generate an output 480. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Object Tracking System

Accurately identifying objects around a vehicle and estimating mobility parameters for the objects (e.g., position, orientation, velocity, trajectory, etc.) can improve the functionality and safety of a vehicle, especially autonomous vehicles. Lidar data associated with lidar images can be used to identify objects and estimate the object's mobility parameters. The lidar data can include lidar points that correspond to the reflection of lidar beams from objects. However, lidar points (or a lidar point cloud) are often sparse, especially for smaller objects and/or as the distance between an object and a lidar sensor increases. For example, in some cases, a smaller and/or relatively distant object may have one or two lidar points that map to (or hit) the object. Having a relatively low number of lidar points for an object can make it more difficult to accurately determine that object's mobility parameters.

In certain cases, to improve the accuracy of identifying objects and estimating mobility parameters, an object tracking system 500 can increase the density of lidar points on an object. In some cases, to increase the density of lidar points, the object tracking system 500 can generate virtual points for an object and associate the virtual points with parameters from lidar points (e.g., 3D location, etc.) mapped to the object. For example, the depth (or z coordinate) of the lidar point on an object can be associated with a proximate virtual point on the object. In some cases, a virtual point can adopt or receive at least some of the parameters of a lidar point (e.g., the depth of the lidar point) that is closest to the virtual point (e.g., nearest neighbor).

In addition, the virtual points on the image can be transformed from a pixel coordinate to a 3D or lidar coordinate. In some such cases, the depth of the virtual point in the lidar coordinates can be the same as the associated lidar point. The x, y coordinates of the virtual point in the lidar coordinate can be generated from the x, y coordinates of the virtual point in the image and a pixel-lidar transformation. The pixel-lidar transformation can be based on a determined or static relationship between the pixels in the image and the lidar coordinates of the lidar. In certain cases, this relationship can be determined based on camera intrinsic parameters (e.g., focal length, image sensor format, and principal point) and extrinsic parameters (e.g., camera's center, heading, position and/or orientation on the vehicle or in world coordinates), such as, by using an intrinsic matrix or extrinsic matrix. The object tracking system 500 can use the virtual points and lidar points to estimate the mobility parameters for the object.

In certain cases, the object tracking system 500 can generate and use a sequence of an object to increase the accuracy of identifying and estimating mobility parameters for an object. In some cases, to generate an object sequence, the object tracking system 500 can identify corresponding objects (or the same object) in different images at different times (e.g., the object in images at times t0, t1, t2, etc.). Certain data (e.g., lidar points, 3D bounding boxes, semantic data, etc.) associated with the object at the different times can provide location information about the object at the different times. The object tracking system 500 can use the location information to generate a sequence for the object, or object sequence, that indicates the location of the object at the different times. The object tracking system 500 can use the object sequence to estimate the mobility parameters for the object.

In some cases, the object tracking system 500 can use virtual points and an object sequence to estimate the mobility parameters for the object. For example, as the object tracking system 500 identifies the object in different images at different times, it can generate virtual points for the object at the different times and associate the virtual points with the lidar points for that time. In this way, the object tracking system 500 can create denser lidar images (having more lidar points within a given area) or lidar point clouds for the object at the different times. The object tracking system 500 can use the denser lidar point clouds to generate the object sequence (having denser lidar data) and use the object sequence to estimate the mobility parameters for the object. By using a sequence of denser lidar point clouds for an object, the object tracking system 500 can improve the estimation of the mobility parameters for the object, which can increase the safety and reliability of a vehicle.

Figure 5A:
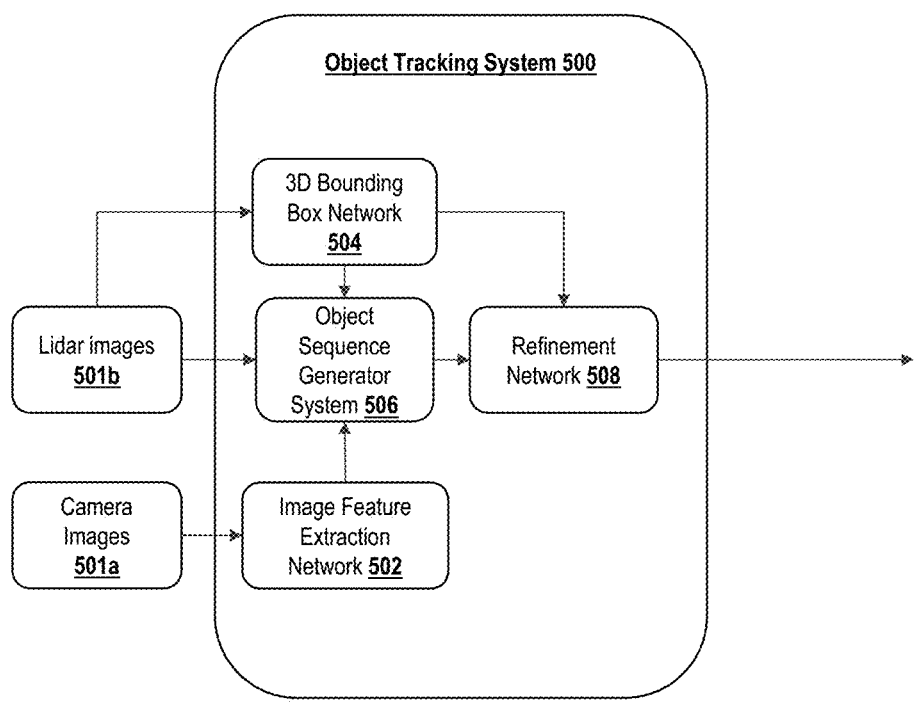
FIG. 5A is a block diagram illustrating an example of an object tracking system.

FIG. 5A is a block diagram illustrating an example of an object tracking system 500 for a perception system 402. The object tracking system 500 can identify and/or track objects around a vehicle 200, such as other vehicles, bicycles, pedestrians, etc.

In the illustrated example of FIG. 5A, the object tracking system 500 receives different types of images 501a, 501b (individually or collectively referred to as images 501), and includes an image feature extraction network 502, 3D bounding box network 504, and object sequence generator system 506, and a refinement network 508. There can be additional elements, fewer elements, different elements, and/or differently arranged elements, than those illustrated in FIG. 5A. For example, in some cases, the object tracking system 500 may not include an image feature extraction network 502 or 3D bounding box network 504. Additionally, or alternatively, at least one element of the object tracking system 500 can perform one or more functions described as being performed by at least one different element of FIG. 5A. Additionally, or alternatively, at least one set of elements of the object tracking system 500 can perform one or more functions described as being performed by at least one different set of elements of the object tracking system 500.

The images 501 can include different types of images corresponding to the sensor or device used to generate them. For example, the images 501a may be camera images generated from one or more cameras, such as cameras 202a. The images 501b, for example, may be lidar images generated from one or more lidar sensors, such as lidar sensors 202b. Other image types can be used, such as radar images generated from one or more radar sensors (e.g., generated from radar sensors 202c).

Image Feature Extraction Network

The image feature extraction network 502 can be implemented using one or more CNNs that are the same as, or similar to, CNNs 420 and can be configured to receive image data associated with the images 501 as input and output a semantic image and/or semantic data associated with features extracted from the image 501, which may also be referred to herein as image semantic data.

In certain cases, the image feature extraction network 502 can be implemented using the DeepLabv3+ or PSP+ neural network models. However, it will be understood that a variety of neural networks can be used to extract features from an image.

As described herein, at least with reference to CNN 420, the image feature extraction network 502 can include one or more filters, convolution layers, subsampling layers, and/or fully connected layers that can be used to identify and classify different objects in an image 501 (e.g., vehicle, pedestrian, bicycle, barrier, traffic cone, drivable surface, or a background, etc.). Accordingly, in certain cases, the semantic data output by the image feature extraction network 502 can identify one or more objects in the image 501, the object classification for the respective objects, and/or a probability that an object has a particular classification.

The semantic image can include rows of pixels. Some or all pixels in the semantic image can include semantic data, such as one or more feature embeddings. In certain cases, the feature embeddings can relate to one or more object attributes, such as but not limited to an object classification or class label identifying an object's classification (sometimes referred to as an object's class) (non-limiting examples: vehicle, pedestrian, bicycle, barrier, traffic cone, drivable surface, or a background, etc.). The object classification may also be referred to as pixel class probabilities or semantic segmentation scores. In some cases, the object classification for the pixels of an image 501 can serve as compact summarized features of the image 501. For example, the object classifications can include a probability value that indicates the probability that the identified object classification for a pixel is correctly predicted.

In some cases, the feature embeddings can include one or more n-dimensional feature vectors. In some such cases, an individual feature vector may not correspond to an object attribute, but a combination of multiple n-dimensional feature vectors can contain information about an object's attributes, such as, but not limited to, its classification, width, length, height, 2d bounding box, etc. In certain cases, the feature embeddings can include one or more floating point numbers, which can assist a downstream model in its task of detection/segmentation/prediction.

3D Bounding Box Network

The 3D bounding box network 504 can be implemented using one or more CNNs that are the same as, or similar to, CNN 420 and/or CNN 440 and can be configured to receive image data associated with an image as input and output feature data associated with one or more features extracted from the image, which may also be referred to herein as 3D feature data and/or 3D semantic data, and/or output an annotated image that includes the image data and feature data associated with the one or more features extracted from the image.

As described herein, at least with reference to CNN 420, the 3D bounding box network 504 can include one or more filters, convolution layers, subsampling layers, and/or fully connected layers that can be used to detect dimensions of objects in an image, such as, but not limited to the width, height, and/or length of the object in the image. The 3D bounding box network 504 can also determine or estimate mobility parameters of the object, such as, but not limited to the object's orientation, 3D location, movement, velocity, trajectory, etc. The 3D bounding box network 504 generate 3D bounding boxes for the object indicating the dimensions and/or mobility parameters of the object.

In some cases, the 3D bounding box network 504 can be implemented using a lidar neural network and/or a prediction network. In certain cases, the 3D bounding box network 504 can be implemented using the PointPillars, VoxelNet, or PointR-CNN networks.

In the illustrated example of FIG. 5A, the image input for the 3D bounding box network 504 is a lidar image 501b. It will be understood that different types of images can be used. In some cases, the image input for the 3D bounding box network can be painted lidar data or a fused image that includes lidar data concatenated with image semantic data from a semantic image, as described in U.S. application Ser. No. 17/096,916 and "PointPainting: Sequential Fusion for 3D Object Detection," arXiv:1911.10150v2 [cs.CV] 6 May 2020, each of which is incorporated by reference herein for all purposes. In some cases, the 3D bounding box network 504 can include a pillar encoder that outputs a pseudo image to a deep learning backbone network. The deep learning backbone can compute and output features to a detection head. The detection head can output oriented 3D bounding boxes, as described in "PointPillars: Fast Encoders for Object Detection from Point Clouds, arXiv:1812.05784v2 [cs.LG] 5 May 2019, the contents of which are incorporated herein by reference in their entirety for all purposes.

The 3D feature data generated by the 3D bounding box network 504 can include, but is not limited to, any one or any combination of dimensions and/or mobility parameters of an object in the image and/or bounding boxes for the object. The generated features can be encoded into the image to form an annotated image. In some cases, the 3D bounding box network 504 can embed the 3D feature data into pixels of an image as one or more features or semantics.

In some cases, some or all pixels in the annotated image can include 3D feature data associated with one or more features extracted from that pixel, a group of pixels, or the image. For example, a pixel in the annotated image can include one or more location values indicating a dimension or mobility parameter associated with the portion of the object that corresponds to the pixel, a bounding box value indicating an edge or a portion of a bounding box. For example, 3D feature data of a pixel can indicate a velocity, orientation, 3D location and/or classification of an object associated with the pixel.

Some or all of the pixels in the annotated image can include additional data. For example, a pixel in the annotated image can include image data associated with at least one type of image (e.g., the image data of at least one of the images used to create the image), image semantic data associated with the image (e.g., the semantic data generated by the image feature extraction network 502, such as the object's classification), and 3D feature data associated with a feature of the object (e.g., the feature data generated by the 3D bounding box network). For example, a pixel in the annotated image can include one or more annotations for location (x, y, z), reflectance, intensity, time stamp, different object class probabilities, associated bounding box, trajectory prediction, movement, velocity estimation, etc.

Object Sequence Generator System

The object sequence generator system 506 can be implemented using one or more processors and can be configured to generate an object sequence. In some cases, the object sequence generator system 506 can use lidar images, 3D bounding boxes, and/or semantic images to generate object sequences for different objects in an image. The object sequences can indicate determined locations of the objects over time. In some cases, a particular object sequence can indicate determined location of a particular object over time.

For example, if a bicycle is identified within a semantic image, the sequence generator system 506 can use 3D feature data generated by the 3D bounding box network 504 and that is associated with the bicycle (including location and estimated velocity data for the bicycle) to locate the bicycle in earlier semantic images, and generate an object sequence for the bicycle that indicates the location of the bicycle over time. The object sequence for the bicycle can increase the accuracy of determining the mobility parameters of the bicycle.

In some cases, the sequence generator system 506 can generate virtual points or virtual lidar points and associate location data associated with real lidar points with the virtual lidar points in order to increase the density of lidar points that are mapped to an object. The increased density of lidar points can increase the accuracy of location and velocity estimations for an object. For example, with continued reference to the bicycle example, the sequence generator system 506 can generate virtual points for the bicycle, associate the depth of the virtual points from nearby lidar points, and determine x, y coordinates of the virtual points by transforming the x, y coordinates of the virtual points from a pixel coordinate to a 3D or lidar coordinate. This can result in a denser point cloud associated with the bicycle.

In some cases, the object sequence generator system 506 can fuse lidar and camera, radar and camera, lidar and radar, and/or lidar, radar, and camera images to form a fused image, and use the fused image to estimate a location of an object in the fused image at different time(s), generate virtual lidar points for objects in the fused image, and/or generate an object sequence for objects in the fused image.

In certain cases, such as where the object sequence generator system 506 fuses lidar, radar, and a camera image, the fused image could include a 3D scene where each point in the 3D scene includes lidar data, radar data, and/or a projected pixel value. In certain cases, each pixel from an image of one type can be mapped to or fused with a pixel from another image of a different type. The resulting pixel may also be referred to herein as a fused pixel. In certain cases, the object sequence generator system 506 fuses corresponding pixels (e.g., pixels at the same x, y position of the respective images) from the images.

In some cases, only some of the pixels from the first image are mapped to, or fused with, a pixel from the second image. For example, the image size of the images may be different such that a pixel from a first image cannot be mapped to a second image (e.g., the first image is larger than the second image) or pixels in the second image are not mapped to the first image (e.g., the second image is larger than the first image).

As another non-limiting example, each pixel from a lower resolution image can be mapped to a pixel in the higher resolution image, whereas not all pixels from the higher resolution image may be mapped to a pixel in the lower resolution image. In some such cases, a pixel from the higher resolution image can be mapped to a pixel in the lower resolution image if a corresponding pixel on the lower resolution exists. For example, lidar images may have a higher or lower resolution than camera images. In some such cases, only some of the pixels in the camera image can be mapped to or fused with a pixel in the lidar image.

In cases where one of the images to be fused is a semantic image, the semantic data from the semantic image can be mapped to, or fused with, a second image. For example, a fused pixel can include image data and/or image semantic data associated with the semantic image and image data associated with the second image. Accordingly, one pixel may be associated with (e.g., include) camera image data (e.g., position (x, y), red, green, blue, etc.), lidar image data (e.g., position (x, y, z), reflectance, intensity, timestamp, etc.), image semantic data (e.g., class label, semantic segmentation score or a computed feature vector, etc.), and/or 3D feature data (e.g., 3D bounding box, mobility parameters, etc.). In some cases, the fused pixel may include one type of image data with image semantic data. For example, a fused image may include lidar image data and image semantic data, but not camera image data, or vice versa. In certain cases, the fused pixel may include multiple types of image data with semantic data, such as lidar, radar and/or camera image data with image semantic data and/or 3D feature data.

Accordingly, the object sequence generator system 506 can output a fused image that includes image semantic data and/or 3D feature data associated with the fused image and image data associated with at least one of the types of images. In some embodiments, the fused image can be similar to other images consumed by a 3D object detector, except that the fused image can include at least one or more additional dimensions (e.g., the image semantic data and/or the 3D feature data).

In some cases, the object sequence generator system 506 can fuse three or more images to generate the fused image. For example, the object sequence generator system 506 can receive image data associated with a lidar image, image semantic data associated with a semantic image generated from a camera image, 3D bounding box data generated by a 3D bounding box, and/or map data associated with a map image (or a map). Other image types, such as radar, can be used. In some such cases, the map data can indicate locations within a geographical area that include crosswalks, car or bicycle lanes, pedestrian walkways, etc. The object sequence generator system 506 can fuse the map data with the image data and the image semantic data to enable the refinement network 508 to generate additional features. In some cases, the object sequence generator system 506 can use fuse the map data with the image data and the image semantic data by projecting the image data to a bird's-eye view image and then embedding some or all of the pixels of the bird's-eye view image with map data and the image semantic data. In some such cases, pixels in the fused image can include image data associated with the lidar/bird's-eye view image, image semantic data associated with the semantic image (e.g., object classification, semantic feature vectors), and map data associated with the map data (e.g., cross walk locations, lanes, etc.).

In some cases, the object sequence generator system 506 uses location information to fuse the map data with the image data. For example, based on the location information, the object sequence generator system 506 can determine a location and/or orientation of the image data relative to the map data. Based on the determined location, the object sequence generator system 506 can determine which pixels of the image are to be annotated or embedded with corresponding map data.

In certain cases, such as where the field of view of two cameras overlap and a semantic image is generated from each of the two camera images, there may be some pixels in the fused image for which different image semantic data can be used (e.g., a pixel from the first camera image and a pixel from the second camera image maps to the same lidar pixel). In some such cases, the image semantic data generated from the two camera image pixels can be randomly chosen for fusion with the image of a different type. In certain cases, the object sequence generator system 506 can assign a higher confidence value to one of the two camera images and use the image semantic data generated from that camera image for fusion with the image of a different type.

In some cases, there may be a greater lag between the time taken to generate a semantic image from an image 501a and provide the semantic image to the object sequence generator system 506 and the time taken to provide the image 501b to the object sequence generator system 506. Accordingly, in some cases, the object sequence generator system 506 can fuse images 501a, 501b that are offset from each other in the time domain. For example, the object sequence generator system 506 can fuse an image 501b, corresponding to time 2, with a semantic image generated from an image 501a that corresponds to time 1. In certain cases, the images 501a, 501b can be offset from each other by one or more microseconds or milliseconds, etc.

Refinement Network

The refinement network 508 can be implemented using one or more CNNs that are the same as, or similar to, CNN 420 and/or CNN 440 and can be configured to receive object sequences, 3D bounding boxes, and/or 3D feature data of an object (including mobility parameters, such as, but not limited to, orientation and/or velocity estimates for the object) as input and output refined feature data, including mobility parameters for the objects from the object sequences, and/or output an annotated image that includes the refined feature data or mobility parameters for the objects. In some cases, the mobility parameters can include a refined or modified orientation and/or velocity estimate relative to an orientation and/or velocity estimate received from the object sequences, 3D bounding boxes, and/or 3D feature data.

In some cases, the refinement network receives semantic data (e.g., image features extracted from an image) concatenated with 3D location data of real/virtual point clouds. For example, pixels in the object sequences can include and semantic data (e.g., object classification) and 3D location data (e.g., lidar/virtual points) for an object (over time). By concatenating the semantic data (e.g., image features extracted from an image) with 3D location data of real/virtual point clouds, the refinement network 508 can provide more accurate mobility parameter determinations and/or estimations.

As described herein, at least with reference to CNN 420, the refinement network 508 can include one or more filters, convolution layers, subsampling layers, and/or fully connected layers that can be used to detect the width, height, and length of an object in the image, generate bounding boxes for the object, determine object mobility parameters (orientation, velocity, etc.), and/or predict the object trajectory.

In some cases, the refinement network 508 can be implemented using a lidar neural network and/or a prediction network. In some cases, the lidar neural network is configured to determine object dimensions and/or mobility parameters and/or modify or refine object dimensions and/or mobility parameters received as input. In certain cases, the refinement network 508 can be implemented using the PointNet, PointNet++, or PointR-CNN networks.

The feature data generated by the refinement network 508, or refined feature data, can include, but is not limited to, any one or any combination of dimensions and/or mobility parameters of an object in the image and/or bounding boxes for the object. The refined feature data can be encoded into an image from the object sequence image to form an annotated fused image.

In some cases, some or all pixels in the annotated image can include refined feature data associated with one or more features extracted from that pixel, a group of pixels, or the image. For example, a pixel in the annotated image can include one or more location values indicating a dimension or mobility parameter associated with the portion of the object that corresponds to the pixel, a bounding box value indicating an edge or a portion of a bounding box. For example, refined feature data of a pixel can indicate a modified velocity, orientation, 3D location and/or classification of an object associated with the pixel, relative to 3D feature data received by the refinement network 508.

Some or all of the pixels in the annotated image can include additional data. For example, a pixel in the annotated image can include image data associated with at least one type of image (e.g., the image data of at least one of the images used to create the image), image semantic data associated with the image (e.g., the semantic data generated by the image feature extraction network 502, such as the object's classification) and 3D feature data associated with a feature of the object (e.g., the feature data generated by the 3D bounding box network). For example, a pixel in the annotated image can include one or more annotations for location (x, y, z), reflectance, intensity, time stamp, different object class probabilities, associated bounding box, trajectory prediction, movement, velocity estimation, etc.

As described herein, by using an object sequence and/or denser point cloud to generate refined feature data and/or an annotated image, the refinement network 508 can provide improved estimates for an object's mobility parameters. The improved estimates can be used by the planning system 404 to plan safer and/or more efficient routes for the vehicle and/or used by the control system 408 to control the vehicle in a safer and/or more effective way.

Example Operating Diagrams

Figure 5B:
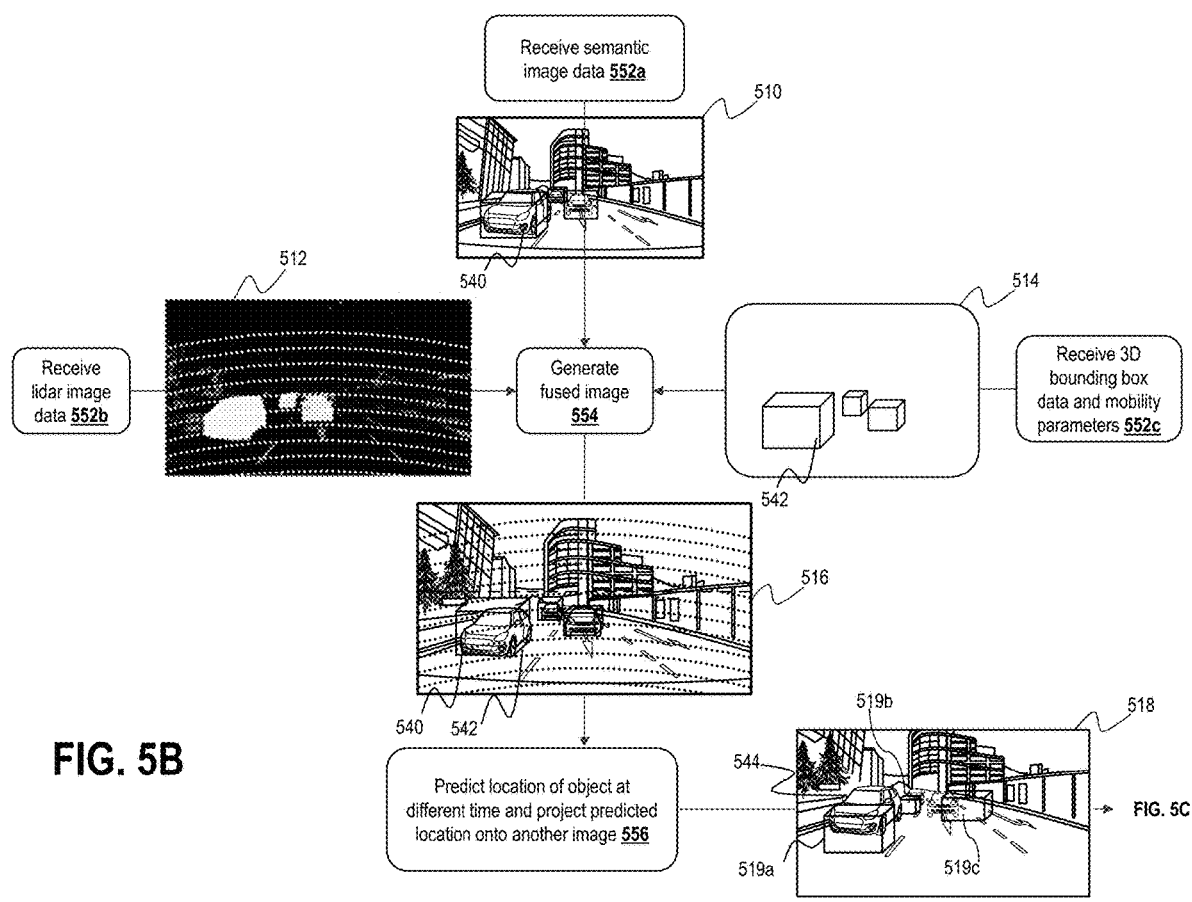
FIGS. 5B and 5C are operation diagrams illustrating an example determination of an object's mobility parameters using an object sequence.
Figure 5C:
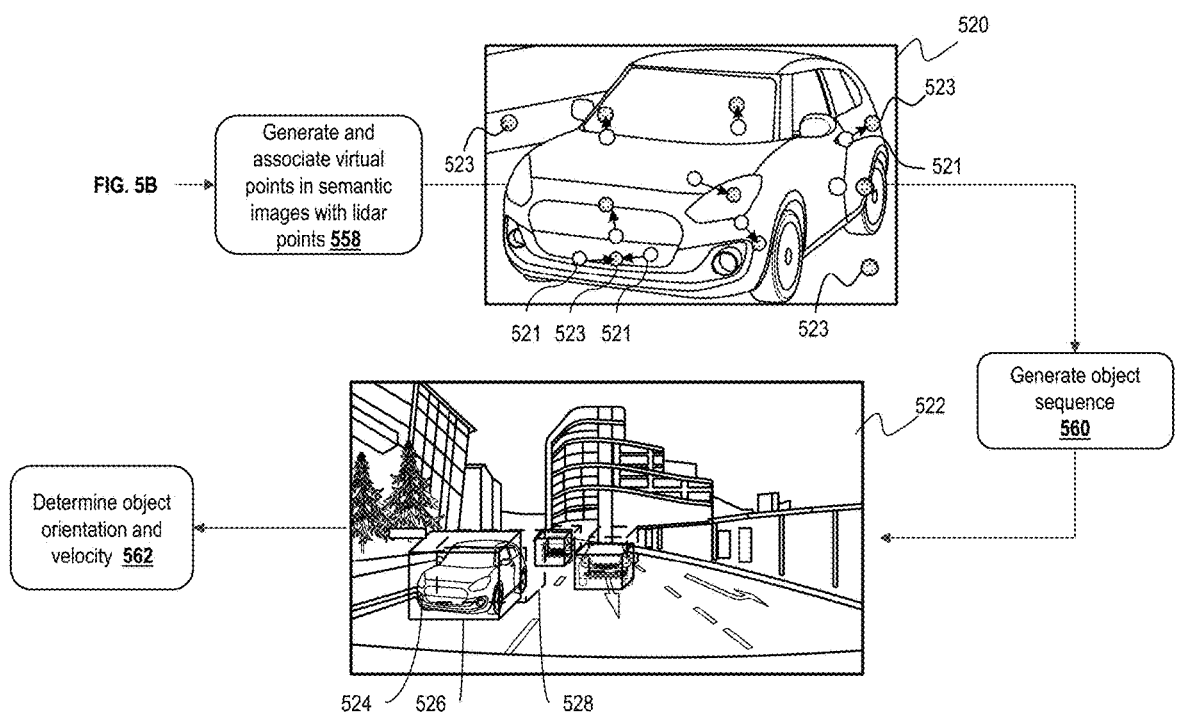

FIGS. 5B and 5C are operation diagrams illustrating an example determination of an object's mobility parameters using an object sequence. Although different steps are described a being performed by particular components of the tracking system, any one or any combination of the components of the tracking system 500 can be used to perform any one or any combination of the steps described herein with reference to FIGS. 5B and 5C.

At step 552a, the object sequence generator system 506 receives semantic image data associated with a semantic image 510 generated by the image feature extraction network 502. As described herein, the image feature extraction network 502 can generate the semantic image data from image data associated with an image received from a camera, such as camera 202a. In some cases, the image can include multiple rows of pixels in a matrix, and each pixel can include a value for red, green, and blue or a grayscale value. In certain cases, the image does not include annotations and/or may be referred to as an unannotated image.

As described herein, the image feature extraction network 502 can use one or more CNNs 420 to generate semantic data for some or all pixels in the semantic image 510 from corresponding pixels in the image 501a. In some cases, the semantic data associated with a particular pixel can include a class label or object classification score that includes a probability value indicating the probability that the identified object classification for a pixel is correctly predicted.

At step 552b, the object sequence generator system 506 receives lidar image data associated with a lidar image 512. In the illustrated example, a lidar image 512 is used, however, it will be understood that different types of images can be used. As described herein, the lidar image 512 can correspond to image data obtained from a lidar sensor, such as lidar sensors 202b. In some cases, the lidar image 512 can include multiple rows of pixels in a matrix, and each pixel can include one or more values for location (e.g., x, y, z), reflectance, intensity, timestamp, etc. In certain cases, the lidar image 512 can be a three-dimensional point cloud. In some cases, the lidar image 512 does not include annotations and/or may be referred to as an unannotated lidar image 512. As described herein, in some cases, due to the lag in generating the semantic image 510 from the camera image 501a, the lidar image 512 may be offset from the camera image 501a in the time domain.

At step 552c, the object sequence generator system 506 receives 3D bounding box data associated with one or more bounding boxes 514 and mobility parameters generated by the 3D bounding box network 504. As described herein, the 3D bounding box network 504 can generate the 3D bounding box data and mobility parameters from lidar data associated with a lidar image 512 and/or from semantic data associated with a semantic image 510. In some cases, the 3D bounding box data and mobility parameters are generated from painted lidar data in which pixels in a lidar image 512 are annotated or embedded with semantic data and/or 3D feature data associated with objects identified in a semantic image 510. In certain cases, the 3D feature data and/or mobility parameters associated with an object include data regarding the object's position, orientation, and/or velocity. The mobility parameters can be received as part of or separately from the 3D bounding box data.

At step 554, the object sequence generator system 506 combines at least a portion of the semantic image 510, lidar image 512, and 3D bounding boxes 514. In certain cases, the combination results in fused image data associated with a fused image 516. As described herein, the fused image 516 can include rows of fused pixels in a matrix and fused image data can be associated with each fused pixel. In some cases, the fused image data associated with a particular pixel can include one or more values for image data associated with the lidar image 512, semantic data associated with the semantic image 510, bounding box data associated with a bounding box 514, and/or image data associated with the camera image 501a. In the illustrated example of FIG. 5B, the fused image 516 includes semantic data associated with the semantic image 510, lidar image data associated with the lidar image 512, and bounding box data associated with the bounding boxes 514. For objects within the fused image 516, the relevant pixels can include features indicating an object associated with the pixel, mobility parameters for the object, 3D bounding boxes for the object, etc.

In the illustrated example, the object sequence generator system 506 receives semantic image data, lidar image data, and 3D bounding box data. However, it will be understood that the object sequence generator system 506 can receiver fewer or more types of data. For example, in some cases, the object sequence generator system 506 receives semantic image data and 3D bounding box data and mobility parameters, but not lidar data. In some such cases, the 3D bounding box data may have been generated from lidar data and may include relevant lidar data, such as x, y, and z coordinates for pixels and/or mobility parameters for objects.

Although reference is made to generating a fused image 516, in some cases, the object sequence generator system 506 may not generate an actual image, but may instead associate lidar image data, 3D bounding box data, and/or semantic image data. For example, the object sequence generator system 506 can associate the 3D bounding box data and/or mobility parameters with the semantic image data to determine a location and/or mobility parameters for objects in the semantic image 510.

By correlating and/or associating the different data, the object sequence generator system 506 can determine additional information about a scene. In some cases, using the semantic data and lidar data, the object sequence generator system 506 can determine a location of an object relative to the vehicle 200. For example, a lidar point that maps to a particular point of an identified object can indicate the location of the particular point of the object at a particular point in time. In some cases, the lidar point indicates the location of the particular point in an ego coordinate system of the vehicle 200. For example, a lidar point that maps to a leg of a pedestrian at time T4 can indicate the location of the leg of the pedestrian relative to the vehicle 200 at time T4. In this manner, the object sequence generator system 506 can determine the location of different parts of objects (and objects as a whole) relative to the vehicle.

In the illustrated example of FIG. 5B, by associating semantic image data, lidar image data, 3D bounding box 514, and mobility parameters, the object sequence generator system 506 identifies and determines the position and mobility parameters for three vehicles. For example, the object sequence generator system 506 can determine there are three vehicles in an image and the general position of the three vehicles within the image using the semantic data, and determine a 3D position, estimated orientation, and estimated velocity of the three vehicles using the lidar data, 3D bounding box data, and/or mobility parameters.

At step 556, the object sequence generator system 506 predicts a location of one or more objects in the fused image 516 (or one or more objects in the semantic image 510) at a different time and projects the predicted location onto an image.

In some cases, the object sequence generator system 506 predicts the location of some or all objects from an image. In certain cases, the object sequence generator system 506 predicts the location of certain types of objects in the image, but not others. For example, the object sequence generator system 506 may estimate the location of pedestrians and bicycles at different times, but not vehicles or trees, etc., or vice versa. Accordingly, the object sequence generator system 506 can use an object type or classification of an object to determine whether to predict the location of that object at a different time.

In some cases, the predicted location corresponds to an estimated location of an object at an earlier point in time. For example, if the object sequence generator system 506 determines that an object is located at position P1 at time T5, the object sequence generator system 506 can predict or estimate the location of the object at time T4. Moreover, the object sequence generator system 506 can predict the location of the objects at multiple times. With continued reference to the example, the object sequence generator system 506 can estimate the location of the object at time T3, T2, and/or T1, etc. The time interval between times can be evenly or unevenly distributed. For example, the time interval between T1-T4 may be constant at 100 ms, 400 ms, 0.5 sec., etc., or the time interval between T1-T4 may vary, such as 100 ms between T1 and T2, 200 ms between T2 and T3, 150 ms between T3 and T4, and 50 ms between T4 and T5, etc.

In some cases, the object sequence generator system 506 can use one or more coordinate transformations to predict the location of an object. For example, the object sequence generator system 506 may determine that Object O1 is located at the ego coordinates (coordinates relative to the vehicle 200) of (5, 5, 5) at time T5. The object sequence generator system 506 can transform ego coordinates to another (second) coordinate system, such as a global coordinate system, birds-eye view coordinate system, or geographic coordinate system. In this example, the transformation may result in the object sequence generator system 506 determining the location of O1 to be at (565, 341, 398) at time T5 in the second coordinate system.

Using the mobility parameters of O1, such as orientation and velocity, the object sequence generator system 506 can predict the location of O1 in the second coordinate system at an earlier time, such as time T4. In some cases, the object sequence generator system 506 can assume that the velocity of O1 and orientation is constant between T5 and T4 to calculate the predicted location of O1 at T4 in the second coordinate system.

The object sequence generator system 506 can transform the predicted location of O1 at T4 from the second coordinate system to a predicted location of O1 at T4 in ego coordinates of the vehicle 200 at T4. In some cases, the object sequence generator system 506 can use a known, determined location, or predicted location, of the vehicle at T4 to transform the predicted location of O1 at T4 from the second coordinate system to the ego coordinate system. The known or determined location, in some cases, can be based on GPS coordinates of the vehicle 200 at T4 and/or based on a calculated location of the vehicle 200 using sensor data, such as lidar and/or radar data. For example, lidar data and/or radar data can be used to identify objects in a scene, which can be associated with a geographic location. A predicted location of the vehicle can be determined similar to the way in which the predicted location of O1 is determined. For example, the object sequence generator system 506 can use the velocity, position, and/or orientation for the vehicle at T5 to predict the vehicle's location at T4. In some cases, the predicted location can include 3D coordinates for the predicted location, a bounding box for the predicted location, or other data to indicate the location of the predicted location relative to other objects in an image, etc.

Having predicted the location of an object at a different time, the object sequence generator system 506 can project the predicted location onto an (second) image 518 that corresponds to that different time. With continued reference to the example, the second image 518 can be a fused image and/or semantic image that corresponds to time T4. In the illustrated example of FIG. 5B, the second image 518 is a semantic image that includes multiple objects at an earlier time than the fused image 516. In the illustrated example, the predicted locations 519a, 519b, 519c, at time T4 of the three vehicle objects identified in the fused image 516 are shown as 3D bounding boxes.

Reference herein to a semantic image 510 or fused image 516 at a particular time can refer to a semantic image 510 or fused image 516 that is generated based on image data captured at the particular time. In some cases, the fused image 516 or semantic image 510 can be generated from image data captured at the particular time and image data captured at a different time. For example, reference to a fused image 516 at T4 can refer to a fused image 516 generated from a camera image captured at T4 and lidar data captured at T5 or T3.

Using the predicted location of the objects from the fused image 516, the object sequence generator system 506 can identify objects in the second image 518 that correspond to the objects in the fused image 516 (e.g., identify the same objects in both images).

In certain cases, the object sequence generator system 506 can use a distance threshold to identify corresponding objects. For example, an object in the second image 518 that satisfies a distance threshold relative to the predicted location of an object from the fused image 516 can be identified as the same object as the object from the fused image 516. The object sequence generator system 506 can use any portion of an object to determine whether the distance threshold is satisfied. For example, the object sequence generator system 506 can compare a determined center of an object with a determined center of a predicted location, bounding box or object boundaries, etc. The distance threshold can be a fixed image-based or geographic distance (e.g., 2, 5, 10 pixels, inches, feet, meters, etc.). In some cases, the object sequence generator system 506 can identify an object in the second image 518 that is closest to the predicted location of the object from the fused image 516 as the same object. In certain cases, the determination of "closest" can take into account the various coordinates of the predicted location in the second image 518 (e.g., the predicted location of various portions of an object).

In some cases, the object sequence generator system 506 can use an object type to identify the same object in different images. For example, for a bicycle identified in the fused image 516, the object sequence generator system 506 can identify an object in the second image 518 as the same object if it is also labeled as a bicycle and may discard objects that satisfy the distance threshold if they have a different classification or type.

At step 558, the object sequence generator system 506 generates virtual points 521 for one or more objects in the second image 518 and associates the virtual points 521 with lidar points 523, as illustrated in image 520. In some cases, the object sequence generator system 506 can generate the virtual points 521 based on an object type of an object. For example, the object sequence generator system 506 can generate virtual points 521 for objects identified as pedestrians and bicycles, but not for objects identified as trees and/or vehicles. However, it will be understood that the object sequence generator system 506 can generate virtual points 521 for any object.

In some cases, the object sequence generator system 506 can generate virtual points 521 based on whether the objects is associated with an object from a different image. For example, the object sequence generator system 506 can generate virtual points 521 for an object in the image 518 if it has been identified as corresponding to an object in the fused image 516. However, it will be understood that the object sequence generator system 506 can generate virtual points 521 for any one or any combination of objects in the image.

The object sequence generator system 506 can associate the virtual points 521 with lidar points 523. For example, at least some of the location data associated with a lidar point 523 can be mapped to or associated with a virtual point 521. As described herein, lidar points 523 can be associated with objects from a semantic image 510 and can indicate a location of the objects (or portions thereof) relative to a vehicle 200 (or relative to a lidar sensor). By associating the virtual points 521 with lidar points 523, the virtual points 521 can adopt at least some of the location data of the respective lidar points 523 (e.g., depth). In this way, the object sequence generator system 506 can increase the number and/or density of points (or a point cloud) on an object.

In some cases, a virtual point 521 can be associated with or adopt at least a portion of the location data of the lidar point 523 that satisfies a distance threshold. The distance threshold can be based on a fixed distance (e.g., a particular number of pixels or geographic distance) and/or a relative distance, such as is a closest neighbor (e.g., the lidar point 523 that is closest to the virtual point 521 on the semantic image 510). In some cases, the object sequence generator system 506 can determine the closest neighbor based on pixels. For example, the closest neighbor lidar point 523 in the image can be the lidar point 523 that has the fewest pixels between it and the virtual point 521. In certain cases, the distance threshold can take into account whether a lidar point 523 maps to the same object as the virtual point 521. For example, the object sequence generator system 506 can associate a virtual point 521 with a lidar point 523 that maps to the same object as the virtual point 521.

In some cases, the object sequence generator system 506 can use the location data of the lidar point 523 to generate location data for the virtual point 521. In certain cases, based on the proximity or distance of the virtual point 521 from the lidar point 523, the object sequence generator system 506 can modify the location data of the lidar point 523 for the virtual point 521.

In certain cases, to determine how to modify the location data, the object sequence generator system 506 can determine a relationship between pixels in the image and location data between lidar points 523 for objects in the image 518. In some cases, the pixel-lidar relationship may be a static (or known) mathematical transformation. In certain cases, the transformation can be based on the vehicle's pose and the parameters of the camera's intrinsic or extrinsic parameters or matrices. In some such cases, to determine the coordinates of the virtual point, the sequence generator system 506 can transform the x, y coordinates of the virtual point from a pixel coordinate to the lidar coordinate using the transformation and interpolate the depth (or z coordinate) of the virtual point based on the depth of the lidar point 523 associated with the virtual point 521. In this way, 2D virtual points can be transformed into 3D coordinates.

In some cases, the object sequence generator system 506 can determine the pixel-lidar relationship by determining the distance between at least two (non-virtual) lidar points 523 that map to the same object in pixels (e.g., how many pixels apart the two points are in the image 518) and in a lidar coordinate system used by the lidar points 523 (e.g., the distance in x, y, z coordinates). Using the pixel and lidar coordinate system distances, the object sequence generator system 506 can determine the pixel-lidar relationship between distances in pixels and lidar coordinates for the object. In certain cases, the object sequence generator system 506 can determine a pixel-lidar relationship for each object or use the same pixel-lidar relationship for some or all of the objects in the image 518.

Using the determined relationship, the object sequence generator system 506 can associate a virtual point 521 with a lidar point 523 and then modify some or all of the lidar coordinates of the lidar point 523 for the virtual point 521 based on the pixel distance between the lidar point 523 and the virtual point 521 and the pixel-lidar distance relationship. For example, the sequence generator system 506 can transform the x, y coordinates of the virtual point based on the pixel-lidar distance relationship and interpolate the depth of the virtual point based on the depth of the lidar point. In this way, the object sequence generator system 506 can generate coordinates for a virtual point 521 using modified location data of a lidar point 523.

At step 560, the object sequence generator system 506 generates an object sequence data associated with an object sequence of an object. A non-limiting example of object sequence data associated with an object sequence is shown in image 522. For example, the object sequence data can include any combination of the data from the fused image 516 (e.g., semantic image data associated with the semantic image 510, 3D box data associated with the 3D boxes 514, and/or lidar data associated with the lidar image 512), predicted location data associated with at least one predicted location of at least one object, a determined location of the object at a different time (e.g., based on a determined location of a corresponding object in a different image at a different time), and/or location data associated with virtual points 521 and/or lidar points 523 for the objects, as illustrated in image 520.

In some cases, the object sequence data associated with an object can indicate the object's determined location in the present time (e.g., via 3D bounding boxes 514 or location data associated with the object) and the object's location at different times, such as earlier times (e.g., via one or more 3D bounding boxes or location data associated with the object at the earlier times). As a non-limiting example and with reference to a particular object 524 in the image 522, the object sequence can include semantic data associated with the object 524 indicating that the object 524 is a vehicle, present time bounding box data associated with the 3D bounding box 526 for the object 524 indicating a general location of the object 524 in three dimensions, present time location data associated with a determined location of the object 524 (including the location of different points of the object 524 based on virtual point 521 and/or lidar points 523), non-present time bounding box data associated with one or more 3D bounding boxes 528 for the object 524 indicating a general location of the object 524 in three dimensions at one or more different times (e.g., earlier or later), and non-present time location data associated with a determined location of the object 524 at different times (including the location of different points of the object 524 at different times based on virtual points 521 and/or lidar points 523). Similarly, other objects in the image 522 can be identified and have one or more present/non-present 3D bounding boxes associated therewith.

At block 562, the refinement network 508 determines mobility parameters of the object using the object sequence. In some cases, the refinement network uses the object sequence, bounding box data associated with bounding boxes 514 (and/or estimated mobility parameters) to determine the mobility parameters. As described herein, in some cases, the object sequences can include semantic data (e.g., object classification) and 3D location data (e.g., lidar/virtual points) for an object (over time). By concatenating the semantic data (e.g., image features extracted from an image) with 3D location data of real/virtual point clouds, the refinement network 508 can provide more accurate mobility parameter determinations and/or estimations. For example, the refinement network 508 can use the determined locations of the object at different times in combination with the mobility parameter estimates from the bounding box network 504 to refine and/or modify the mobility parameters estimates.

By using the object sequence in combination with the mobility parameter estimates from the bounding box network 504, the refinement network 508 can improve the accuracy of the mobility parameters determined for an object. In some cases, using the object sequence to determine mobility parameters for an object has been found to reduce error by at least 15%.

Fewer, more, or different steps can be used. In some cases, the object sequence generator system 506 may not generate a fused image 516 per se, but may instead correlate, associate, or use data from a semantic image 510, one or more bounding boxes 514, and/or a lidar image 512 to predict a location of an object in the semantic image 510 at a different point in time.

To illustrate the process, consider the following non-limiting scenario in which the image feature extraction network 502 generates a semantic image 510 from one or more camera images captured at time t0 and the 3D bounding box network 504 generates one or more 3D bounding boxes 514 from one or more lidar images captured at time t0 and/or the one or more camera images captured at time t0. In this example, the semantic image 510 includes an object identified as Vehicle1 540 and the 3D bounding boxes 514 include a 3D bounding box 542 that corresponds to Vehicle1 540 (although the object sequence generator system 506 may have not yet determined that the 3D bounding box is a 3D bounding box of Vehicle1).

The object sequence generator system 506 can receive the semantic image 510 (with the semantic image data associated with Vehicle1 540) from the image feature extraction network 502, the 3D bounding boxes 514 (with the 3D bounding box 542 associated with Vehicle1 540) from the 3D bounding box network 504, and/or the one or more lidar images captured at time t0. Using the semantic image 510, 3D bounding boxes 514, and/or lidar data associated with the lidar images (which may come with the 3D bounding boxes 514), the object sequence generator system 506 can associate the 3D bounding box 542 for Vehicle1 540 with the semantic image data for Vehicle1 540 and predict a location for Vehicle1 540 at a previous point in time t(−1).

In some cases determining the predicted location 519a of the Vehicle1 540 at t(−1) can include transforming the location of Vehicle1 540 from an ego coordinate system at t(0) to a geographic coordinate system, determining the predicted location of Vehicle1 in the geographic coordinate system at t(−1) based on the estimated velocity and orientation of Vehicle1 at t(0), determining the location of the vehicle 200 at t(−1), and transforming the predicted location of Vehicle1 540 from the geographic coordinate system to the ego coordinate system of vehicle 200 at t(−1).

Using the predicted location 519a of Vehicle1 at t(−1) and a semantic image 518 generated using one or more images captured at time t(−1), the object sequence generator system 506 can identify an object 544 in the earlier semantic image 518 that corresponds to Vehicle1 540. For example, the object sequence generator system 506 can map the predicted location 519a of Vehicle1 to the semantic image 518 at t(−1) and identify an object 544 in the semantic image 518 at t(−1) as Vehicle1 if the object 544 is also labeled as a vehicle and satisfies a location threshold relative to the predicted location 519a of Vehicle1 540 (e.g., is the closest object in the semantic image 518 at t(−1) that is labeled as a vehicle, is within a particular number of pixels to the predicted location, etc.).

The object sequence generator system 506 can also generate virtual points 521 for Vehicle1 540/544, and map the virtual points 521 to lidar points 523 from lidar images captured at t(−1) that map to Vehicle1 540/544. Specifically, the object sequence generator system 506 can assign the virtual points 521 the same depth, velocity, and other data as the lidar point 523 that is closest to the virtual point 521, or otherwise satisfies a location threshold relative to a virtual point 521. In certain cases, the object sequence generator system 506 can transform location data of the virtual points from a pixel or 2D coordinates to lidar or 3D coordinates based on (using) 2D location data of the virtual point, the depth of the associated lidar point, and a pixel-lidar transformation. In certain cases, the mapping of virtual points 521 to lidar points 523 can result in a one-to-one or one-to-many relationship between lidar points 521 and virtual points 523.

The object sequence generator system 506 can generate an object sequence for the Vehicle1 540/544. The object sequence can include the location information of 540/544 at time t0 and t(−1) (which can include the virtual points 521 and lidar points 523 for Vehicle1 540/544 at time t0 and t(−1)), the semantic image 510 generated based on images captured at time t0, and/or the 3D bounding box 542 generated based on the lidar images captured at time t0.

The object sequence generator system 506 can provide the object sequence to the refinement network 508, which can use it to determine, estimate, or modify the estimate of the mobility parameters of Vehicle1 540/544, such as the orientation and/or velocity of Vehicle1 540/544. In some cases, the refinement network 508 can receive the 3D bounding box data associated with the bounding box 542 and/or mobility parameters associated with Vehicle1 540/544 from the object sequence generator system 506 and/or the 3D bounding box network 504.

Example Flow Diagram of Tracking System

Figure 6:
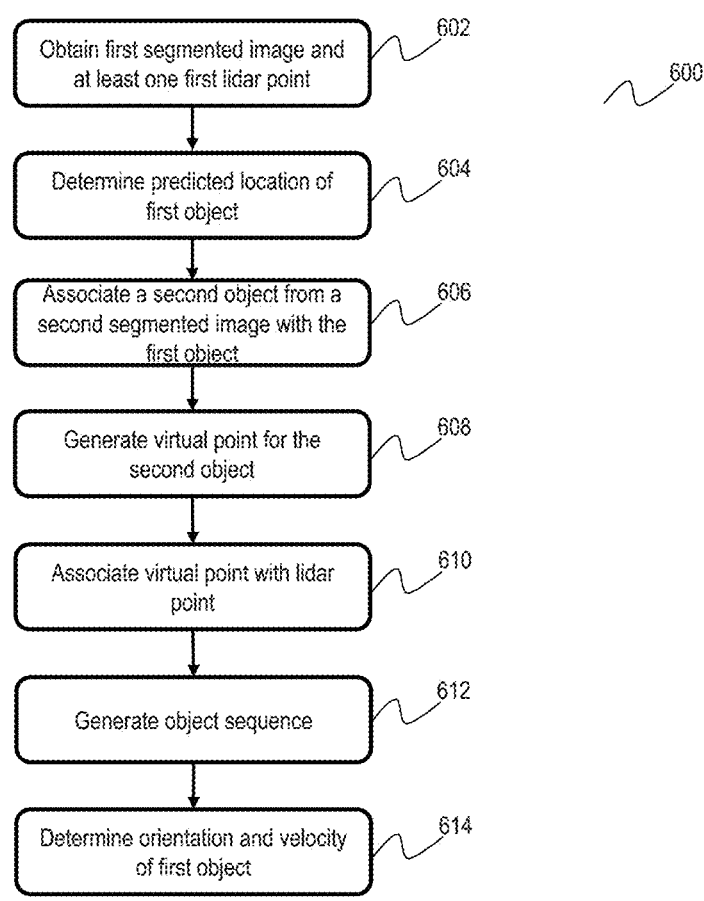
FIG. 6 is a flow diagram illustrating an example of a routine implemented by one or more processors to determine mobility parameters of an object.

FIG. 6 is a flow diagram illustrating an example of a routine 600 implemented by one or more processors to determine mobility parameters of an object. The flow diagram illustrated in FIG. 6 is provided for illustrative purposes only. It will be understood that one or more of the steps of the routine illustrated in FIG. 6 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 602, the training system 500 obtains semantic image data associated with a semantic image and mobility parameters for an object in the semantic image. In some cases, the training system 500 obtains the semantic image data by generating it from first image data associated with a first image using, for example an image feature extraction network 502. In certain cases, the training system 500 obtains the semantic image data by receiving it from an image feature extraction network 502. As described herein, in some cases, the first image can be a camera image that includes rows of colored or grayscale pixels. However, it will be understood that other, different types of images, such as lidar images and/or radar images can be used.

As described herein, the training system 500 can determine semantic data associated with some or all of the pixels in the first image. In certain cases, the semantic data associated with a pixel includes a class label or object classification that associates the pixel with an object.

As described herein, the training system 500 can obtain the mobility parameters for the object in a variety of ways. In some cases, the training system 500 can generate the mobility parameters by associating lidar data with objects in the semantic image. For example, the training system 500 can map lidar points to objects in the semantic image and use the location data associated with the lidar points to determine mobility parameters for the object to which the lidar points are mapped. In certain cases, the training system 500 can generate the mobility parameters using, or receive the mobility parameters from, a 3D bounding box network 504. As described herein, the 3D bounding box network 504 can generate the mobility parameters for the object using lidar data and/or semantic data associated with the object.

At block 604, the training system determines a predicted location of the object at a different time. As described herein, the different time can be before (or after) the time associated with the semantic image and/or lidar points. For example, the training system 500 can predict the location of the object at a time prior to that time at which the image data and/or lidar data used to generate the semantic image was captured.

In some cases, to determine the predicted location, the training system 500 transforms the mobility parameters of the object from a first coordinate system to a second coordinate system. For example, the training system 500 can transform location data for the object from a vehicle's ego coordinate system to a geographic or map coordinate system. The training system can predict the location of the object in the second coordinate system at the second time using the determined location of the object at the first time and an estimated velocity and/or orientation of the object at the first time. The training system can transform the predicted location from the second coordinate system to the first coordinate system, and determine the predicted location of the object relative to a vehicle at the second time based on a determined location the vehicle at the second time.

In certain cases, the determined location of the vehicle can correspond to a location of the vehicle at the second time based on GPS coordinates of the vehicle and/or based on lidar or other sensor data used to determine the location of the vehicle. In certain cases, the determined location of the vehicle can correspond to an estimated location. In some such cases, the estimated location can be determined based on a determined location of the vehicle at the first time and a velocity and orientation of the vehicle at the first time.

At block 606, the training system associates a second object from a second image at the second time with the first object from the first semantic image. In certain cases, the association between the first object and the second object can indicate that the second object is the first object at a different point in time (e.g., if the first object is a vehicle, the second object is the same vehicle at an earlier point in time). In some cases, the second image can be a camera image, a semantic image, and/or a fused image.

The training system 500 can use different data to identify an object in the second image to associate with the first object. For example, the training system 500 can use location data associated with objects in the second image, the estimated location of the first object, object type, etc., to identify an object in the second image to associate with the first object.

In certain cases, to associate the second object with the first object, the training system 500 can compare location data of objects (e.g., pixel location and/or location data associated with lidar points mapped to the objects) in the second image at the second time with the predicted location of the first object at the second time. In certain cases, the training system 500 can associate the object in the second image that is closest (e.g., in terms of pixel locations and/or based on a comparison of lidar data or location data) to the estimated location of the first object with the first object.

In some cases, the training system 500 can associate an object in the second image with the first object based on a determination that a distance between the second object and the predicted location of the first object satisfies a distance threshold. The distance threshold can be a relative or absolute distance. For example, the threshold distance can correspond to the distance that is smallest as compared to the distance between the predicted location of the first object and the location of other objects in the second image. As another example, the distance threshold can correspond to a number of pixels between one or more portions of the second object and the predicted location of the first object, a geographic distance between the determined geographic location of the second object and the predicted geographic location of the first object at the second time, etc.

At block 608, the tracking system 500 generate one or more virtual points for the second object. In some cases, the tracking system 500 can map tens, hundreds, or thousands of virtual points to the second object. The tracking system 500 can generate and map the virtual points in a variety of ways. In some cases, the tracking system 500 maps virtual points to the second object according to a pattern. For example, the tracking system can generate and map a virtual point to a second object at regular pixel distances (e.g., every 10 pixels). In certain cases, the tracking system generates and maps virtual points to certain portions of the second object. For example, the tracking system 500 can generate and map virtual points to an edge (or proximate an edge) of the object, along an edge or surface area of a 3D bounding box associated with the object, at the center of the object, etc. In some cases, the tracking system 500 can generate and map virtual objects proximate to lidar points that are mapped to the object. As described herein, lidar data associated with lidar images can be mapped and/or correlated to objects in a semantic image. In some cases, the tracking system 500 can use the location of the lidar points on the image to generate one or more virtual points proximate the lidar points.

In some cases, the tracking system 500 generates virtual points for some or all objects in the second image. In certain cases, the tracking system 500 generates virtual points for objects within a particular semantic image that have a particular object type. For example, the tracking system 500 can generate virtual points for pedestrian and/or bicycle objects, but not for tree objects.

In certain cases, the tracking system 500 generate and maps virtual points based on an association with an object from another image. For example, the tracking system 500 can generate virtual points for objects in a semantic image that have been identified as being the same object as an object from an image at a different time. In this way, the tracking system 500 can reduce the number of objects for which it generates virtual points.

At block 610, the tracking system 500 associates a virtual point with a lidar point. In some cases, the tracking system 500 associates each virtual point that it has mapped to an object to a lidar point that is also mapped to the object. In certain cases, the tracking system 500 associates virtual points with lidar points that are proximate to the virtual point. For example, the tracking system 500 associates a virtual point with a lidar point that has a distance that satisfies a distance threshold with the virtual point. In some cases, the threshold distance can be based on a pixel distance between virtual point on the semantic image and the lidar point on the semantic image. In some cases, the distance threshold can be a fixed distance (e.g., 5, 10, 20, or 50 pixels) or a relative distance (e.g., the lidar point that has the smallest distance to the virtual point relative to other lidar points).

In some cases, a virtual point that is associated with a lidar point can adopt or copy at least some of the location data of the lidar point. For example, the virtual point can adopt the depth or z coordinate of the lidar point with which it is associated. In certain cases, the tracking system 500 can generate some of the location data (e.g., the x, y coordinates) for the virtual point. For example, the tracking system 500 can use a relationship between lidar or 3D coordinates and 2D or pixel coordinates to transform the pixel or 2D coordinates of the virtual point to lidar or 3D coordinates In certain cases, the tracking system can use a static or known pixel-lidar transformation to determine the 3D location of the virtual point. In some such cases, the pixel-lidar transformation can be based on the camera's intrinsic or extrinsic parameters or matrices and the vehicle's pose.

In some cases, the tracking system 500 can determine the relationship between 3D distances and pixel distances for an object by comparing the 3D location and pixel location of one lidar point mapped to an object with the 3D location and pixel location of one or more other lidar points mapped to the object. In some cases, the tracking system 500 can use the same 3D location-pixel location relationship for some or all objects in a semantic image and/or generate a particular geographic location-pixel location relationship for some or each object in a semantic image. For example, the tracking system 500 can generate a 3D location-pixel location relationship for each object in an image that has been associated with another object in a different image.

At block 612, the tracking system 500 generates an object sequence for an object. In some cases, the object sequence can identify the type of the object (e.g., pedestrian, bicycle, vehicle, etc.), a determined location of the object at a first time, and a determined location for the object at one or more other times (before or after) the first time.

In some cases, the tracking system 500 can generate an object sequence for some or all objects in an image. In some cases, the tracking system 500 generates an object sequence for objects of a particular type, objects associated with at least one object from at least one other image, etc.

In some cases, the object sequence can include a correlation and/or association of data associated with an object. For example, the object sequence for the object can include semantic image data associated with the object (e.g., object type, 2D bounding boxes associated with the object), current location data associated with the object (e.g., location of the object at the first time), other location data associated with the object (e.g., a predicted location of the object at different times based on an estimated velocity and/or orientation and/or a determined location of the object at different times based on the determined location of a second object from a different image that is associated with the first object), lidar and/or virtual points associated with the object, etc. The lidar points and/or virtual points can include location data for particular portions of the object at the same or different times (e.g., one or more sets of lidar/virtual points that indicate a location of different portions of the object at different times, where each set indicates a location of different portions of the object at a particular time).

At block 614, the tracking system 500 determines mobility parameters for an object. In some cases, the tracking system 500 can determine mobility parameters for some or all of the objects in an image. In certain cases, the tracking system 500 determines mobility parameters for objects in an image for which the tracking system 500 has an object sequence. In some cases, the tracking system 500 determines mobility parameters for objects in an image for which the tracking system 500 has virtual points associated with lidar points.

In some cases, the tracking system 500 uses the refinement network 508 to determine the mobility parameters. In certain cases, the refinement network 508 uses any one or any combination of an object sequence, virtual and/or lidar points, and/or 3D bounding boxes (or estimated mobility parameters) to determine mobility parameters for an object. For example, the refinement network 508 can take the estimated mobility parameters and/or 3D bounding boxes and modify or adjust them based on the object sequences and/or virtual/lidar points. The virtual/lidar points can increase the density of points on an object, which can increase the accuracy of mobility parameters for the object. Similarly, using the location data of the object sequence that is associated with the object at different times, the refinement network can improve the accuracy of the mobility parameters for the object. As described herein, in some cases, the refinement network can decrease mobility parameter errors by at least 15%.

In some cases, the tracking system 500 can generate refined feature data associated with objects in an image. As described herein, in some cases, the tracking system 500 uses a refinement network 508 to generate the refined feature data associated with the object. The refinement network 508 can generate various features for the object, including, but not limited, dimensions and/or mobility parameters for an object. As described herein, the resulting image can include rows of pixels and refined feature data associated with some or all of the pixels of the image.

The routine 600 can include fewer, more, or different blocks. In addition, any one or any combination of the blocks can be reordered or performed concurrently. For example, blocks 608 and 610 can be performed before, after, or concurrently with blocks 602, 604, and 606. In some cases, the routine 600 can omit blocks 608 and 610. In some such cases, the tracking system 500 can generate an object sequence that includes a determined location of an object at different times (with less dense points or point clouds for an object), and use the object sequence to determine mobility parameters for an object. In certain cases, the routine 600 can omit blocks 606, 608, and 612, and determine mobility parameters for an object using one or more predicated locations of the object at different times and an object with a greater density of points, or omit blocks 604, 606, 608, and 612 and determine mobility parameters for an object using an object with a greater density of points.

In certain cases, the routine 600 can include separate blocks for determining a location for the first object in the first semantic image, associating or mapping lidar points at the second time to the second object, and/or generating a fused image that includes semantic data and/or location data of objects. In some cases, to generate a fused image, the tracking system 500 can embed a second image with the semantic data associated with the semantic image. As described herein, the second image can be a different type of image. For example, if the first image is a camera image, the second image can be a lidar image, such as a 3D point cloud. Similar to the first image, the second image can include rows of pixels. As the second image is a different type of image, the image data associated with a particular pixel can be different. For example, if the second image is a 3D point cloud, the image data associated with a particular pixel can include a position (x, y, z), reflectance, intensity, timestamp, etc. As described herein, the fused image can include rows of pixels embedded with semantic data associated with the semantic image and image data associated with the second image (and/or first image). For example, if the second image is a 3D point cloud, a pixel in the fused image can include or be embedded with one or more object classifications, as well as location (x, y, z), reflectance, intensity, and timestamp. In some such cases, the fused image can be referred to as a decorated 3D point cloud.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
    receiving a first semantic image associated with a first time, the first semantic image comprising a first object;
    receiving at least one first lidar point associated with the first object;
    determining a location and estimated velocity of the first object;
    determining a predicted location for the first object at a second time based at least in part on the determined location and the estimated velocity of the first object, wherein the second time is prior to the first time;
    associating a second object of a second semantic image with the first object based at least in part on the predicted location of the first object at the second time;
    the associating at least one second lidar point with the second object, wherein the at least one second lidar point is associated with the second time;
    generating a virtual point for the second object;
    associating the at least one second lidar point with the virtual point;
    generating an object sequence for the first object based at least in part on the at least one first lidar point, the at least one second lidar point, and the virtual point; and
    determining orientation and velocity for the first object based at least in part on the object sequence.

2. The method of claim 1, wherein receiving the first semantic image comprises receiving the first semantic image from an image segmentation network.

3. The method of claim 2, wherein the image segmentation network is implemented using a convolutional neural network.

4. The method of claim 1, wherein the first object is at least one of a pedestrian, a bicycle, or a vehicle.

5. The method of claim 1, wherein the at least one first lidar point maps to the first object within the first semantic image.

6. The method of claim 1, wherein the virtual point is a second virtual point, the method further comprising:
    generating a first virtual point for the first object; and
    associating the first virtual point with the at least one first lidar point,
    wherein generating the object sequence for the first object comprises generating the object sequence for the first object based at least in part on the at least one first lidar point, the at least one second lidar point, the second virtual point, and the first virtual point.

7. The method of claim 1, wherein associating the virtual point with the at least one first lidar point comprises assigning location data associated with a location of the at least one first lidar point to the virtual point based at least in part on a determination that the at least one first lidar point is a closest lidar point to the virtual point that is mapped to the first object.

8. The method of claim 1, wherein determining the location and estimated velocity of the first object comprises receiving the location and estimated velocity of the first object from a 3D box prediction network.

9. The method of claim 1, wherein determining the location and estimated velocity of the first object comprises receiving the location and estimated velocity of the first object from a 3D box prediction network.

10. The method of claim 1, wherein the predicted location is a first predicated location and the virtual point is a first virtual point, the method further comprising:
    determining a second predicted location for the first object at a third time based at least in part on the determined location and the estimated velocity of the first object, wherein the third time is prior to the first time and the second time;
    associating a third object of a third semantic image with the first object based at least in part on the predicted location of the first object at the third time;
    associating at least one third lidar point with the third object, wherein the at least one third lidar point is associated with the third time;
    generating a second virtual point for the third object; and
    associating the at least one third lidar point with the second virtual point,
    wherein generating the object sequence for the first object comprises generating the object sequence for the first object based at least in part on the at least one first lidar point, the at least one second lidar point, the first virtual point, the at least one third lidar point, and the second virtual point.

11. The method of claim 1, the at least one second lidar point maps to the second object within the second semantic image.

12. The method of claim 1, wherein generating the virtual point for the second object comprises generating a plurality of virtual points for the second object, and
    wherein associating the at least one second lidar point with the virtual point comprises associating the at least one second lidar point with the plurality of virtual points based at least in part on a determination that the at least one second lidar point is a closest lidar point to the plurality of virtual points that is mapped to the second object.

13. The method of claim 1, wherein the virtual point is a first virtual point, the method further comprising:
    generating a second virtual point for the second object; and
    associating a third lidar point that maps to the second object with the second virtual point,
    wherein generating the object sequence for the first object comprises generating the object sequence for the first object based at least in part on the at least one first lidar point, the at least one second lidar point, the first virtual point, the third lidar point, and the second virtual point.

14. The method of claim 1, wherein associating the at least one second lidar point with the virtual point comprises assigning location data associated with a location of the at least one second lidar point to the virtual point.

15. The method of claim 1, wherein the object sequence comprises at least a portion of the first semantic image, a three-dimensional location of the first object, and a three-dimensional location of the second object.

16. A system, comprising:
at least one processor configured to:
receive a first semantic image associated with a first time, the first semantic image comprising a first object;
receive at least one first lidar point associated with the first object;
determine a location and estimated velocity of the first object;
determine a predicted location for the first object at a second time based at least in part on the determined location and the estimated velocity of the first object, wherein the second time is prior to the first time;
associate a second object of a second semantic image with the first object based at least in part on the predicted location of the first object at the second time;
the associate at least one second lidar point with the second object, wherein the at least one second lidar point is associated with the second time;
generate a virtual point for the second object;
associate the at least one second lidar point with the virtual point;
generate an object sequence for the first object based at least in part on the at least one first lidar point, the at least one second lidar point, and the virtual point; and
determine orientation and velocity for the first object based at least in part on the object sequence.

17. The system of claim 16, wherein the virtual point is a second virtual point, and wherein the at least one processor is further configured to:
generate a first virtual point for the first object; and
associate the first virtual point with the at least one first lidar point,
wherein to generate the object sequence for the first object, the at least one processor is configured to generate the object sequence for the first object based at least in part on the at least one first lidar point, the at least one second lidar point, the second virtual point, and the first virtual point.

18. The system of claim 16, wherein to associate the virtual point with the at least one first lidar point, the at least one processor is configured to assign location data associated with a location of the at least one first lidar point to the virtual point based at least in part on a determination that the at least one first lidar point is a closest lidar point to the virtual point that is mapped to the first object.

19. The system of claim 16, wherein the predicted location is a first predicated location and the virtual point is a first virtual point, and wherein the at least one processor is further configured to:

determine a second predicted location for the first object at a third time based at least in part on the determined location and the estimated velocity of the first object, wherein the third time is prior to the first time and the second time;
associate a third object of a third semantic image with the first object based at least in part on the predicted location of the first object at the third time;
associate at least one third lidar point with the third object, wherein the at least one third lidar point is associated with the third time;
generate a second virtual point for the third object; and
associate the at least one third lidar point with the second virtual point,
wherein to generate the object sequence for the first object, the at least one processor is configured to generate the object sequence for the first object based at least in part on the at least one first lidar point, the at least one second lidar point, the first virtual point, the at least one third lidar point, and the second virtual point.

20. At least one non-transitory storage media storing instructions that, when executed by at least one processor, cause the at least one processor to:
receive a first semantic image associated with a first time, the first semantic image comprising a first object;
receive at least one first lidar point associated with the first object;
determine a location and estimated velocity of the first object;
determine a predicted location for the first object at a second time based at least in part on the determined location and the estimated velocity of the first object, wherein the second time is prior to the first time;
associate a second object of a second semantic image with the first object based at least in part on the predicted location of the first object at the second time;
the associate at least one second lidar point with the second object, wherein the at least one second lidar point is associated with the second time;
generate a virtual point for the second object;
associate the at least one second lidar point with the virtual point;
generate an object sequence for the first object based at least in part on the at least one first lidar point, the at least one second lidar point, and the virtual point; and
determine orientation and velocity for the first object based at least in part on the object sequence.

* * * * *